United States Patent
Nakatani et al.

(10) Patent No.: US 7,990,565 B2
(45) Date of Patent: Aug. 2, 2011

(54) RECORDING SYSTEM AND RECORDING METHOD FOR RECORDING SOUND AND IMAGES ON SOUND PAPER

(75) Inventors: Keiji Nakatani, Toyokawa (JP); Kenji Ogasawara, Kawaguchi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1325 days.

(21) Appl. No.: 11/296,272

(22) Filed: Dec. 8, 2005

(65) Prior Publication Data
US 2007/0041594 A1 Feb. 22, 2007

(30) Foreign Application Priority Data
Aug. 18, 2005 (JP) .................. 2005-237658

(51) Int. Cl.
*G06K 15/00* (2006.01)

(52) U.S. Cl. ...................... 358/1.18; 358/1.12

(58) Field of Classification Search .......... 358/1.15, 358/1.12, 1.18
See application file for complete search history.

(56) References Cited

U.S. PATENT DOCUMENTS

| | | | |
|---|---|---|---|
| 6,972,856 B1 * | 12/2005 | Takahashi | 358/1.14 |
| 2004/0257601 A1 * | 12/2004 | Tomiyasu et al. | 358/1.9 |
| 2005/0094183 A1 * | 5/2005 | Kojima | 358/1.14 |
| 2005/0207812 A1 * | 9/2005 | Miyazaki | 399/407 |

FOREIGN PATENT DOCUMENTS

| | | |
|---|---|---|
| JP | 1-97687 | 6/1989 |
| JP | 2000-050202 | 2/2000 |
| JP | 2002-023286 | 1/2002 |
| JP | 2003-046914 | 2/2003 |
| JP | 2003-103969 | 4/2003 |
| JP | 2003-109617 | 4/2003 |
| JP | 2005-099704 | 4/2005 |
| JP | 2005-165156 | 6/2005 |

OTHER PUBLICATIONS

Notification of Reason for Refusal in JP 2005-0237658 dated Mar. 25, 2008, and Translation thereof.
Notification of Reasons for Refusal in JP 2005-237658 dated Aug. 19, 2008, and English Translation thereof.

* cited by examiner

*Primary Examiner* — Twyler L Haskins
*Assistant Examiner* — Fred Guillermety
(74) *Attorney, Agent, or Firm* — Buchanan Ingersoll & Rooney PC

(57) ABSTRACT

A recording system is equipped with a pre-processing device which serves as an image recording unit for recording an image on sound paper based on image data, and a post-processing device which serves as a sound data recording unit for recording sound data related to the image data on the sound paper.

20 Claims, 12 Drawing Sheets

FIG. 5 ( A )
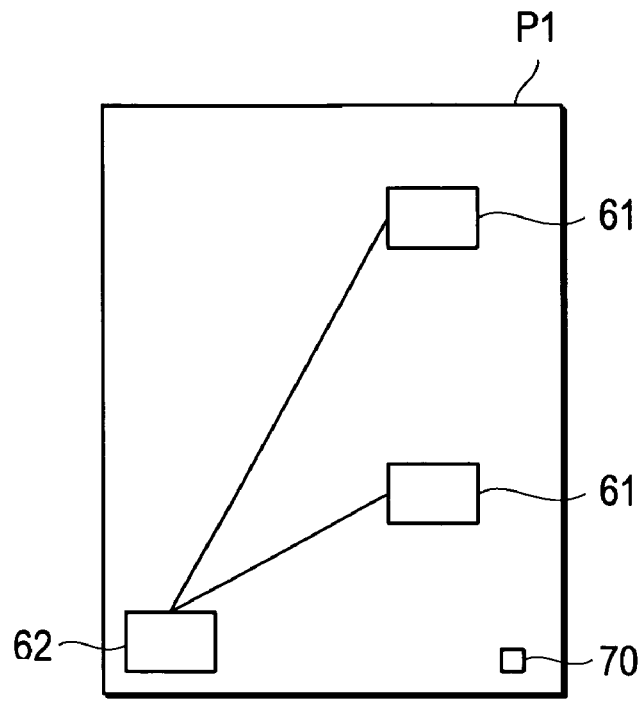
FIG. 5 ( B )
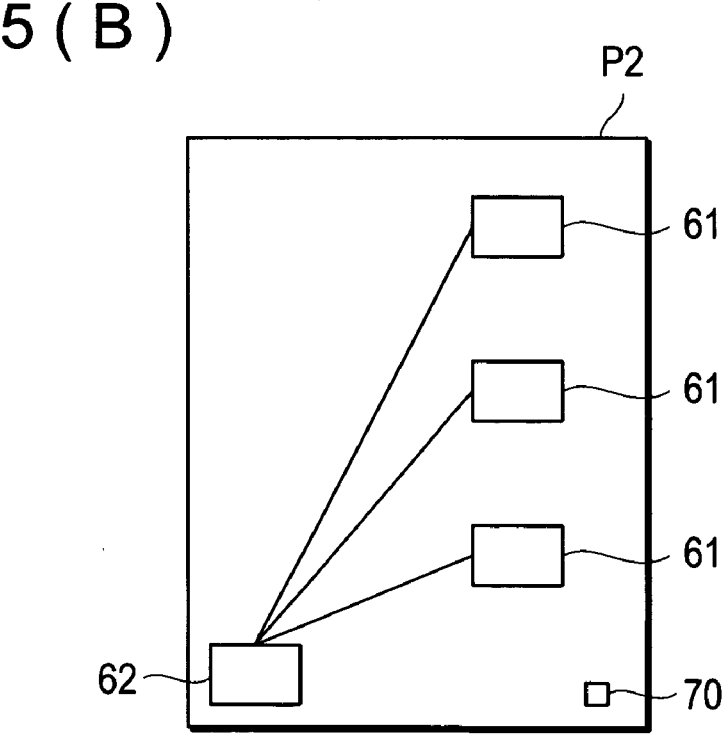

RECORDING SYSTEM AND RECORDING METHOD FOR RECORDING SOUND AND IMAGES ON SOUND PAPER

CROSS-REFERENCE TO RELATED APPLICATION

This application is based on Japanese Patent Application No. 2005-237658 filed on Aug. 18, 2005, the contents of which are hereby incorporated by reference.

BACKGROUND OF THE INVENTION

1. Field of the Invention

The present invention relates to a recording system and a recording method. The invention particularly relates to a recording system and a recording method using "sound paper".

2. Description of the Related Art

Direct mail with printed information of products and services is widely used for the purpose of expanding sales and promotion. More effective appeal to users is always in need in such a field of direct mail application for improving the rate of reply and the rate of sales expansion.

Sound paper capable of recording and reproducing sound has been proposed as an effective means for appealing to the users more efficiently in the use of direct mail and message cards (Unexamined Publications No. JP-A-2003-103969, JP-A-2003-109617, JP-A-2005-099704, and JP-A-2005-165156).

On the other hand, the need for variable print has been increasing for mass printing typified by direct mail from the standpoint of CRM (Customer Relationship Management). Variable print here means a printing method in which the output contents of each page can be partially changed depending on users' needs.

However, application of the above-mentioned sound paper has been limited to personal purposes such as congratulatory cards and the like or direct mail on which the same sound data is uniformly recorded for the purpose of introducing a specific merchandise and service.

In other words, the technology disclosed by the abovementioned Unexamined Publications does not provide any specific method of reproducing sound data suitable for each individual user using the sound paper produced through the variable printing that is capable of changing printed contents for each user. Therefore, there is a problem that, even if sound paper is used in the variable printing, it is still not possible to provide a more effective appeal to each user.

OBJECTS AND SUMMARY

It is an object of the present invention to provide a recording system and a recording method for solving the abovementioned problem.

It is another object of the present invention to provide a recording system and a recording method for enabling a more effective appeal by means of suitable sound for each individual user using sound paper produced through the variable printing.

According to an embodiment of the invention, there is provided a recording system comprising an image recording unit for recording an image on sound paper based on image data and a sound data recording unit for recording sound data related to the image data on the sound paper.

According to another embodiment of the invention, there is provided a pre-processing device, which is applied to a recording system containing an image recording device for recording an image on sound paper based on image data, and a sound data recording device for recording sound data related to the image data on the sound paper, wherein either one of the image recording device and said sound data recording device is used as a pre-processing device and the other is used as a post-processing device, the pre-processing device comprising a recording unit for recording identification information that relates the image data and the sound data on the sound paper.

According to still another embodiment of the invention, there is provided a post-processing device, which is applied to a recording system containing an image recording device for recording an image on sound paper based on image data, and a sound data recording device for recording sound data related to the image data on the sound paper, wherein either one of the image recording device and the sound data recording device is used as a pre-processing device and the other is used as a post-processing device, the post-processing device comprising a reading unit for reading identification information recorded on the sound paper to relate the image data and the sound data.

According to a further embodiment of the invention, there is provided a recording method comprising the steps of 1) recording an image on sound paper based on image data and 2) recording sound data related to the image data on the sound paper.

The objects, characteristics and properties of this invention other than those set forth above will become apparent from the description given herein below, and with reference to preferred embodiments illustrated in the accompanying drawings.

BRIEF DESCRIPTION OF THE DRAWINGS

FIG. 5A and FIG. 5B show two kinds of sound paper used in the first embodiment.

DETAILED DESCRIPTION OF PREFERRED EMBODIMENTS

The embodiments of this invention will be described below with reference to the accompanying drawings.

Figure 1:
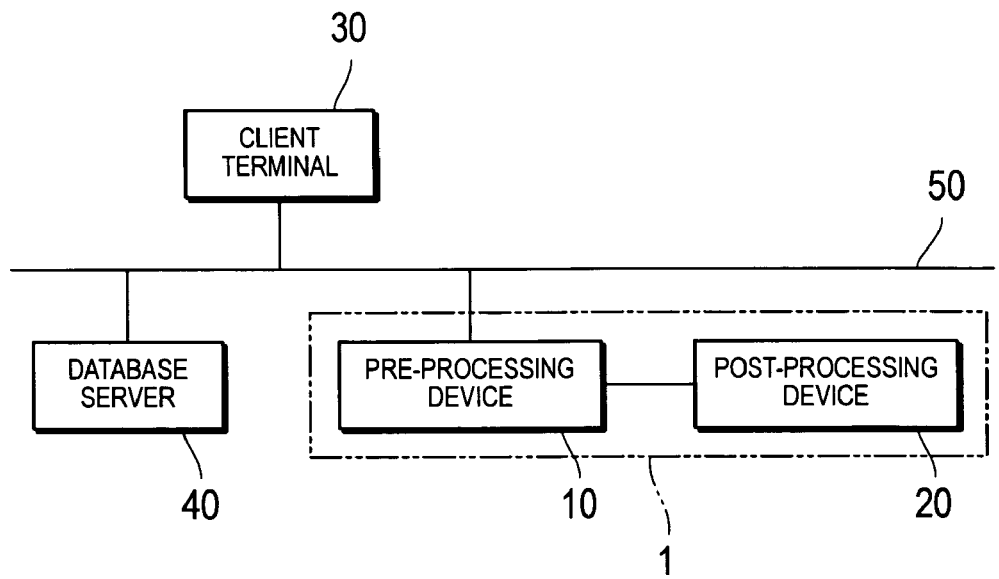
FIG. 1 is an overall block diagram of a network system according to the first embodiment of the invention.

FIG. 1 is an overall block diagram of a network system according to the first embodiment of the invention.

The network system is equipped with a recording system 1, a client terminal 30, and a database server 40, and they are connected with each other communicably via a network 50.

The recording system 1 has a pre-processing device 10 and a post-processing device 20. The pre-processing device 10 is connected to the network 50, while the pre-processing device 10 and the post processing device 20 are connected via a dedicated interface bus such as IEEE 1394 serial bus. However, the pre-processing device 10 and the post processing device 20 may also be connected through the network 50.

The network 50 can be a LAN connecting computers and networking equipment according to standards such as Ethernet®, Token Ring, and FDDI, or a WAN that consists of several LANs connected by a dedicated line. The types and the number of equipment to be connected to the network 50 are not limited to those shown in FIG. 1.

The pre-processing device 10 in this embodiment is an image recording unit for conducting the process of recording images on the sound paper based on the provided image data, and the post-processing device 20 is a sound data recording unit for conducting the process of recording the sound data related to the particular image data, on the particular sound paper. The detail of the sound paper will be described later.

Figure 2:
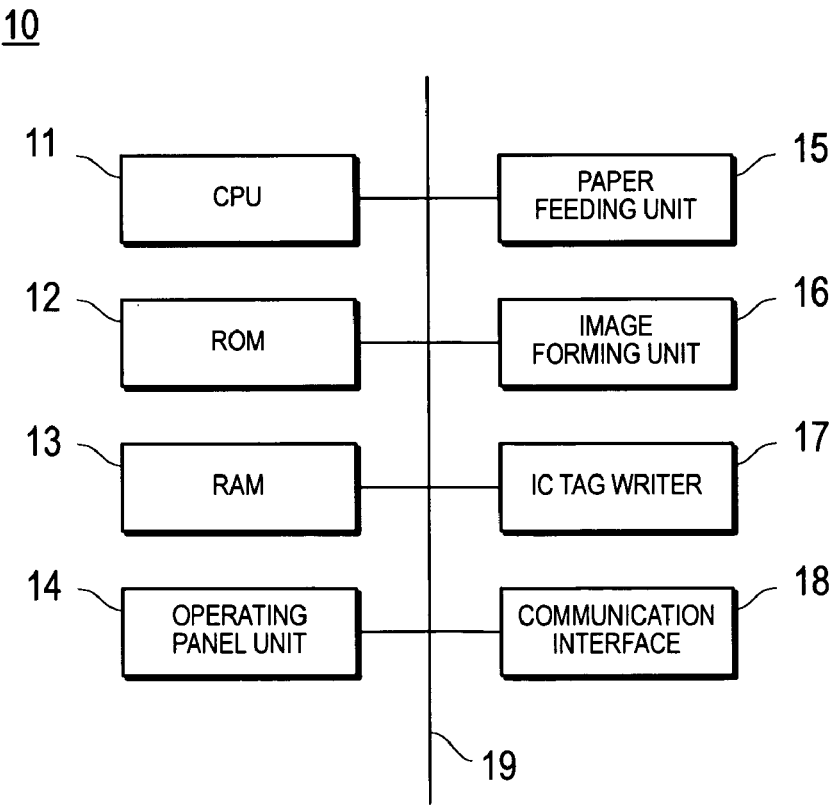
FIG. 2 is a block diagram showing general constitution of a pre-processing device.

FIG. 2 is a block diagram showing the general constitution of the pre-processing device 10.

The pre-processing device 10 has a CPU 11, a ROM 12, a RAM 13, an operating panel unit 14, a paper feeding unit 15, an image forming unit 16, an IC tag writer 17, and a communication interface 18, all of which are interconnected with each other via a bus 19 for exchanging signals.

The CPU 11 controls various parts indicated above and executes various arithmetic processes according to a program. The ROM 12 stores various programs and data in advance. The RAM 13 functions as a working area and stores programs and data temporarily.

The operating panel unit 14 is equipped with a touch panel, a ten-key pad, a start button, a stop button and others to be used for displaying various data and entering various instructions.

The paper feeding unit 15 stores the sound paper as a recording medium to be used in printing. The paper feeding unit 15 feeds the stored sound paper, one sheet at a time to the image forming unit 16. The paper feeding unit 15 in the present embodiment has two paper feeding trays T1 and T2 (not shown) in accordance with the number of sound paper types.

The image forming unit 16 prints various images on the sound paper using publicly known imaging processes such as the electronic photographing process including electrical charging, exposure, developing, transferring and fixing.

The IC tag writer 17 writes electronic data on the IC tag provided on the sound paper. As a communication system between the IC tag writer 17 and the IC tag, those international standards such as ISO 14443 and ISO 15693 can be applied with frequency bands such as 135 kHz, 13.56 MHz, and 2.45 GHz. The normally used frequency band is 13.56 MHz and the communication range is approximately 30 cm when this frequency band is used. However, communication systems to be applied are not limited to those mentioned above, and other known communication systems or proprietary communication systems may be used.

The communication interface 18 is for the pre-processing device to communicate with other equipment. The communication interface 18 is equipped with an interface to communicate with the equipment on the network 50, and another interface to communicate with the post-processing device 20.

Figure 3:
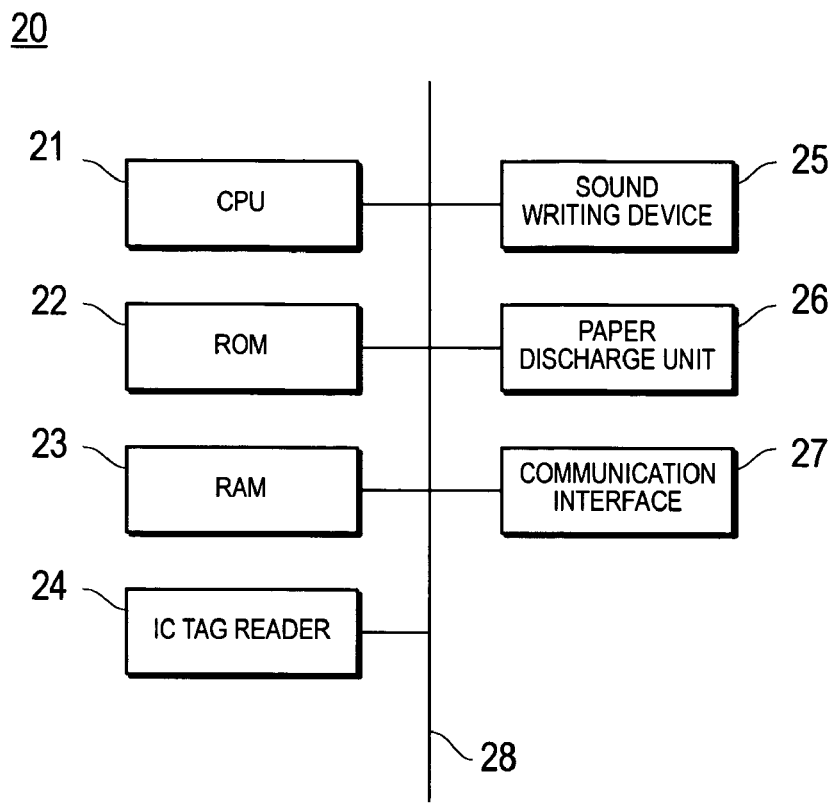
FIG. 3 is a block diagram showing general constitution of a post-processing device.

FIG. 3 is a block diagram showing general constitution of the post-processing device 20.

The post-processing device 20 has a CPU 21, a ROM 22, a RAM 23, an IC tag reader 24, a sound writing device 25, a paper discharging unit 26, and a communication interface 27, all of which are interconnected with each other via a bus 28 for exchanging signals. As for those components having the same functions as those of the pre-processing device 10, duplicating descriptions are omitted.

The IC tag reader 24 reads electronic data on the IC tag provided on the sound paper. The IC tag reader 24 can read the entire electronic data stored in the IC tag or read the data by each specified unit depending on the instruction given by the CPU 21. The IC tag writer 17 can be an identical unit as the IC tag reader 24, and the communication system between the IC tag reader 24 and IC tags can be the same as that of the IC tag writer 17.

The sound writing device 25 records sound data on the sound paper. The sound writing device 25 has two sound writing units W1 and W2 (not shown) in accordance with the number of sound paper types. The paper discharging unit 26 discharges the sound paper with the sound data recorded.

The pre-processing device 10 and the post-processing device 20 can include constituent elements other than those described above, and they don't necessarily have to include a part of the abovementioned elements.

The client terminal 30 is typically a normal personal computer. The client terminal 30 generates a printing job for the variable printing and transmits it to the pre-processing device 10 of the recording system 1.

The database server 40 stores various kinds of sound data. The database server 40 transmits requested sound data to the post-processing device 20 in accordance with a request made by the post-processing device 20 of the recording system 1.

Preferably, a printing job in this embodiment is given in a file of a format conforming to the PPML (Personalized Print Markup Language). A printing job in this case is given in a file, into which contents data for each object, layout information indicating a layout of objects on each page, and job information such as specification of printing conditions are combined. However, the contents data, layout information and job information can be transmitted independently.

Figure 4:
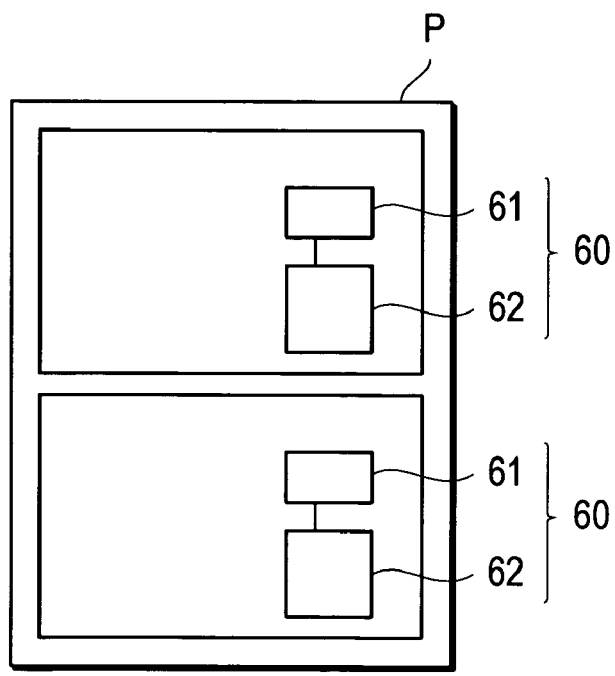
FIG. 4 shows an example of sound paper.

FIG. 4 shows an example of the sound paper. In this specification, the sound paper means a sheet of paper which is constituted in such a way that the sound data is recorded onto it and can be reproduced as a sound.

The sound paper P has at least one sound unit 60 capable of recording sound data and reproducing a sound. The sound unit 60 has a sound reproducing button 61 that functions as a trigger of sound reproduction, and a sound processing mechanism 62 consisting of a sound recording unit such as a microphone and an input terminal, a reproduction unit such as a speaker, a sound data storage unit such as memory, and a power source. Each sound unit 60 has one single sound reproduction button 61 and a sound uniquely determined according to each sound reproduction button 61 is reproduced when a relevant sound reproduction button 61 is depressed. However, one single sound processing unit 62 can also be shared by a plurality of sound reproduction buttons 61. In this case, one sound processing mechanism 62 is sufficient for a sheet of sound paper.

FIG. 5A and FIG. 5B show two kinds of sound paper used in the first embodiment. As can be seen from them, multiple types of sound paper can be handled in this invention.

In the first embodiment, two different kinds of paper P1 and P2, having different numbers and different kinds of sound reproduction buttons 61, are handled. The sound paper P1 has two sound reproduction buttons 61, 61 and one sound processing mechanism 62, and the sound paper P2 has three reproduction buttons 61, 61, 61 and one sound processing mechanism 62.

The sound paper P1 is held in the paper tray T1 and the sound paper P2 in the paper tray T2 of the paper feeding unit 15 respectively. However, the paper feeding unit 15 can also be configured in such a way that it has only one paper tray and the user manually sets different kinds of paper according to each printing job or each series of printing jobs. Moreover, although the use of cut paper is assumed in the present embodiment, continuous paper can also be used.

Moreover, the sound paper in the first embodiment includes an IC tag 70 in at least one portion of itself. The IC tag 70 can be glued on to the sound paper or embedded in the sound paper. There can be one or a multiplicity of IC tags 70 on a sheet of the sound paper.

The IC tag 70 is a contactless electronic tag using wireless communication and contains a memory unit containing an IC chip and an antenna unit containing a coil (neither of them shown). When the IC tag 70 receives a radio wave emitted from the IC tag reader 24 or the IC tag writer 17, an electric current runs through the IC tag 70 due to electromagnetic coupling. Thus, the IC tag 70 communicates with the IC tag reader 24 or the IC tag writer 17 in order to read or write electronic data.

Figure 6:
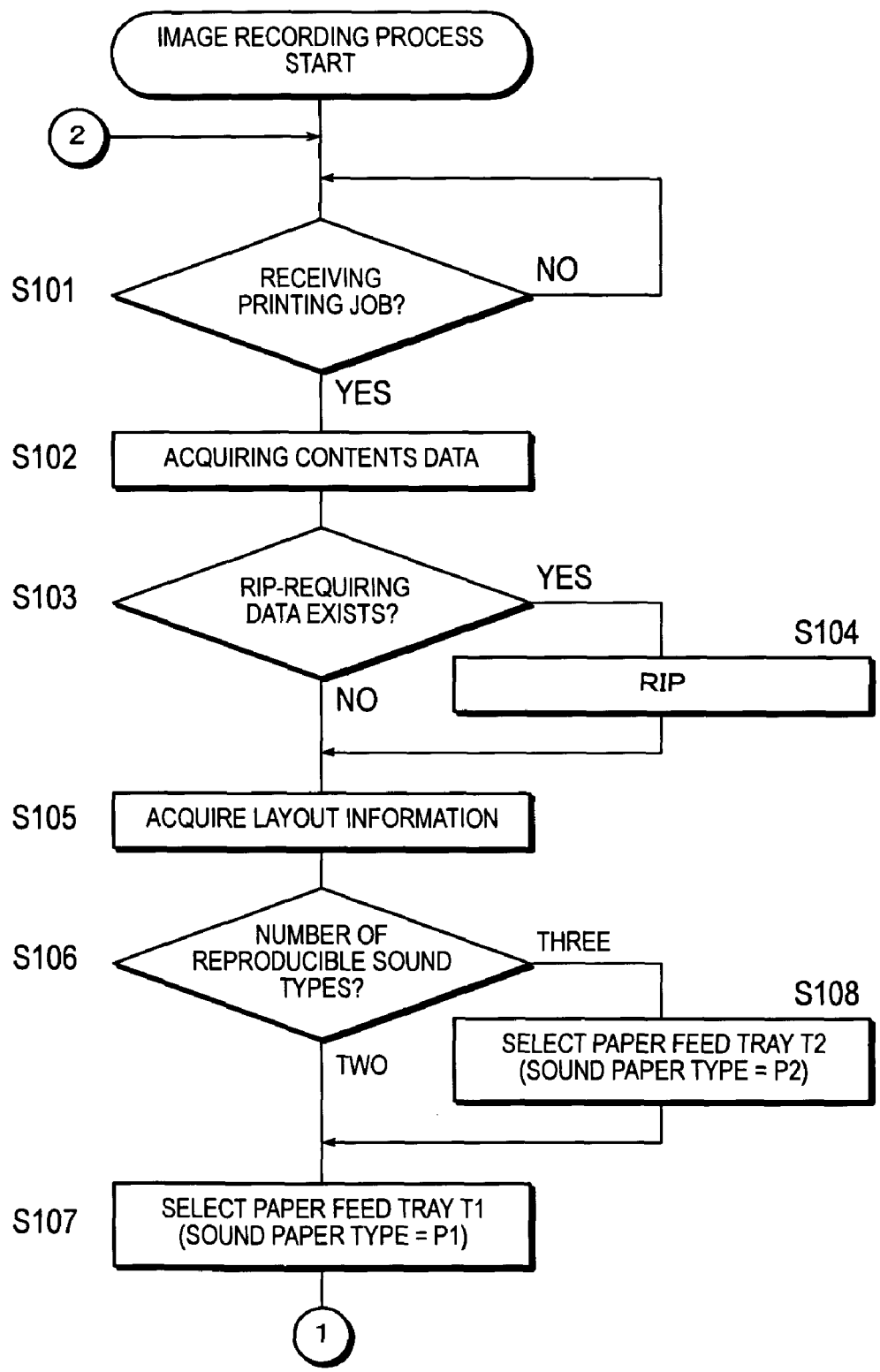
FIG. 6 is a flowchart showing image recording process in a pre-processing device.
Figure 7:
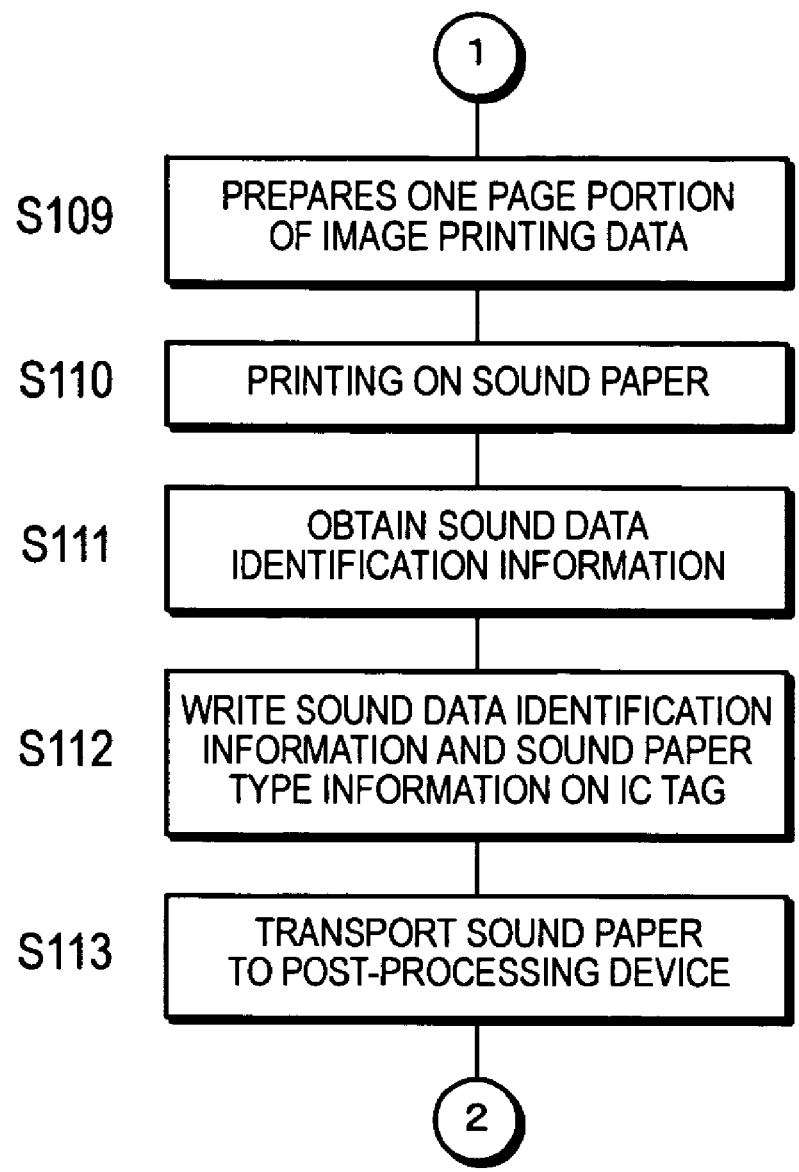
FIG. 7 is a flow chart, continuing from FIG. 6, showing the image recording process in the pre-processing device.

Next, the image recording process in the pre-processing device 10 will be described below referring to FIG. 6 and FIG. 7. The algorithms shown in the flowcharts of FIG. 6 and FIG. 7 are stored as a program in a memory unit such as the ROM 12 of the pre-processing device 10 and executed by the CPU 11 in the following manners.

First, the pre-processing device 10 remains standing by until a printing job is received from the client terminal 30 (S101: No).

Upon receiving a printing job (S101: Yes), the pre-processing device 10 saves the received printing job in the RAM 13, and obtains the contents data from the printing job (S102).

Sound data identification information corresponding to the printing job is received from the client terminal 30 together with the printing job and stored into the RAM 13. The sound data identification information can be contained in the printing job. The sound data identification information is for identifying uniquely the sound data stored in the database service 40 and the like on the network 50. It can also be configured to receive the sound data itself instead of the sound data identification information.

Next, a judgment is made as to whether there is any data that requires RIP (Raster Image Processing), in the obtained contents data (S103). The RIP here is a process of converting the data into bit map type image data. If the contents data does not contain any data requiring RIP (S103: No), the program advances to the step S105.

On the other hand, if the contents data include any data requiring RIP (S103: Yes), the RIP is applied to that particular data (S104).

In the step S105, the layout information is obtained from the stored printing job.

Next, a judgment is made as to how many kinds of reproducible sounds exist based on the obtained layout information (S106). In the present embodiment, the number is two or three (see FIG. 5A and FIG. 5B).

When the number of kinds of reproducible sounds is judged to be two (S106: 2), the paper feeding tray T1 is selected (S07). The type of sound paper used in this case is P1. On the other hand, when the number of types of reproducible sound is judged to be three (S106: 3), the paper feeding tray T2 is selected (S108). The type of sound paper used in this case is P2. The paper feeding tray to be used may also be selected based on the type of paper specified in the job information of a particular printing job.

Next, one page portion of printing image data is prepared by combining a series of the contents data of the printing job, part of which was subjected to RIP (S109). More specifically, the image corresponding to each content data is arranged according to the location of each sound reproducing button judged from the layout information of the sound paper, to be combined into the one page portion. A mark image representing the sound reproducing button and an image with a message prompting the reproduction of sound are arranged at the location of each sound reproduction button identified by the layout information of the sound paper. The one page portion of printing image data is prepared according to such a layout. The layout information of the sound paper is assumed to be pre-registered for each sound paper in the RAM 13. The layout information of the sound paper can be obtained by the user's input through the operation panel 14 or can also be obtained by reading the electronic data stored in the IC tag 70.

The image will then be printed on the sound paper based on the thus prepared one page portion of printing image data (S110).

Next, sound data identification information is obtained (S111). The sound data identification information is stored in advance in the RAM 13 as mentioned before.

Next, the sound data identification information obtained in the step S111 and the sound paper type information obtained in either the step S107 or the step S108 are written into the IC tag 70 of the sound paper by the IC tag writher 17 (S112).

The sound paper is transported to the post-processing device 20 once the image recording process for this is completed (S113). Although such transportation of the sound paper to the post-processing device 20 is executed automatically by a transportation mechanism (not shown) in this embodiment, it can also be executed manually. If sound data itself is received instead of sound data identification information, the sound data is transmitted to the post-processing device 20.

Figure 8:
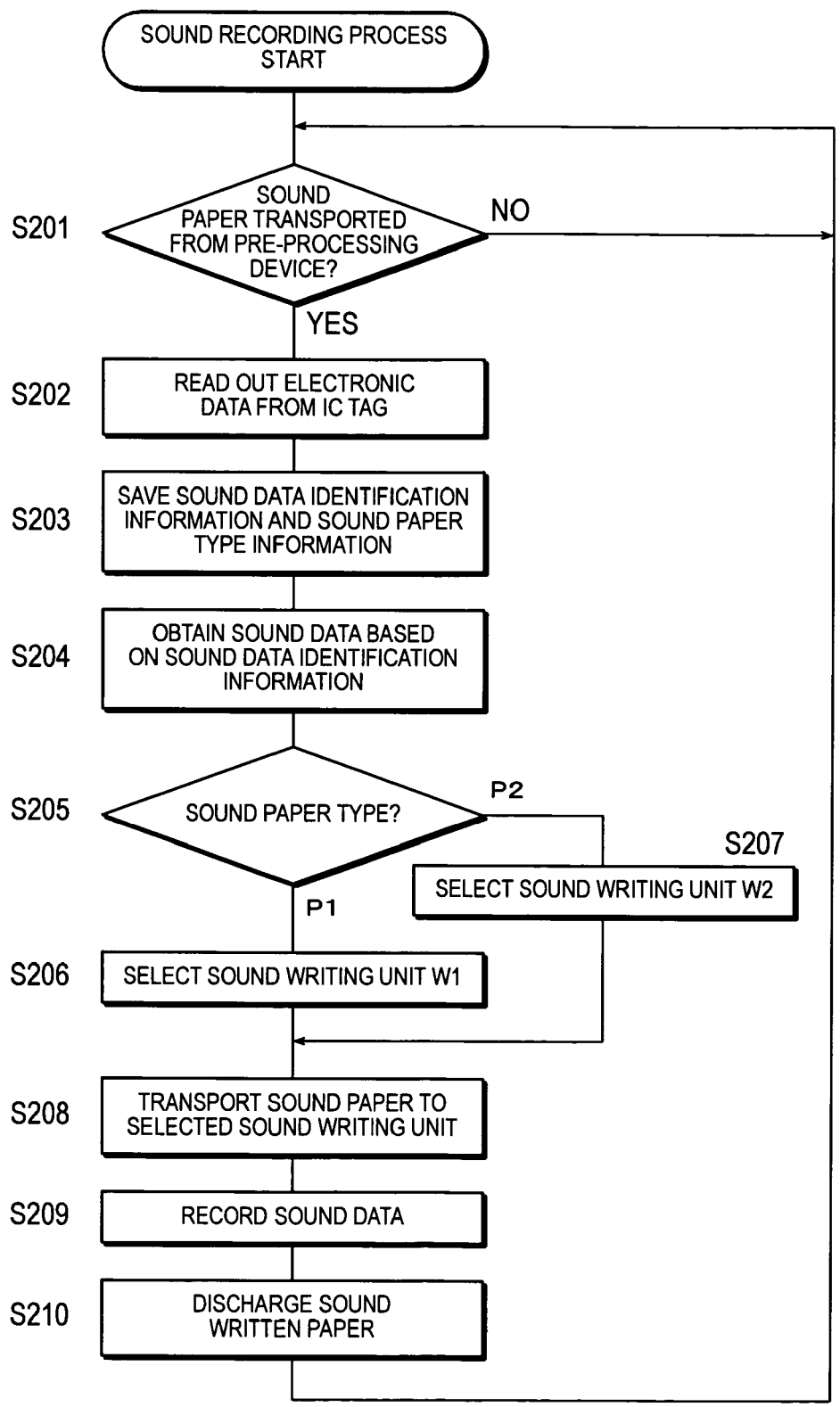
FIG. 8 is a flowchart showing sound recording process in a post processing device.

Next, the sound recording process in the post-processing device 20 will be described below with reference to FIG. 8. The algorithm shown in the flowcharts of FIG. 8 is stored as a program in a memory unit such as a ROM 22 of the post-processing device 20 and executed by the CPU 21.

The post-processing device 20 remains standing by until the sound paper is transmitted from pre-processing device 10 (S201: No).

Upon receiving the sound paper (S201: Yes), the electronic data is read by the IC tag reader 24 from the IC tag 70 provided on that sound paper (S202).

Next, the sound data identification information and the sound paper type information are obtained from the electronic data read out and stored in the RAM 23 (S203).

The sound data stored in the database server 40 on the network 50 is obtained based on the sound data identification information (S204). However, if the sound data itself, instead of the sound data identification information, is received from the pre-processing device 10, the sound data is used.

Next, a judgment is made as to what the sound paper type information represents (S205). If the sound paper type information is P1 (S205: P1), the sound writing unit W1 is selected (S206), while, if the sound paper type information is P2 (S205: P2), the sound writing unit W2 is selected (S207).

If it is necessary to change the location where the sound data is stored depending on the arrangement of the sound processing mechanism 62 (recording unit) on the sound paper and so forth, the number of sound writing units is changed in accordance with the number of types of layouts of the sound processing mechanism 62. However, the sound processing mechanisms of the sound paper P1 and the sound paper P2 are located in the same position in this embodiment, and hence it is not always necessary to provide more than two sound writing units. In this embodiment, the post-processing device 20 has two sound writing units W1 and W2 under the assumption that the recording conditions are different between the sound paper P1 and P2.

Next, the sound paper is transported to the selected sound writing unit (S208) where the obtained sound data is recorded by the sound writing unit into the sound data storage unit of the sound processing mechanism 62 of the transported sound paper (S209).

The sound paper is discharged to the tray (not shown) once the sound recording process is completed (S210).

Figure 9:
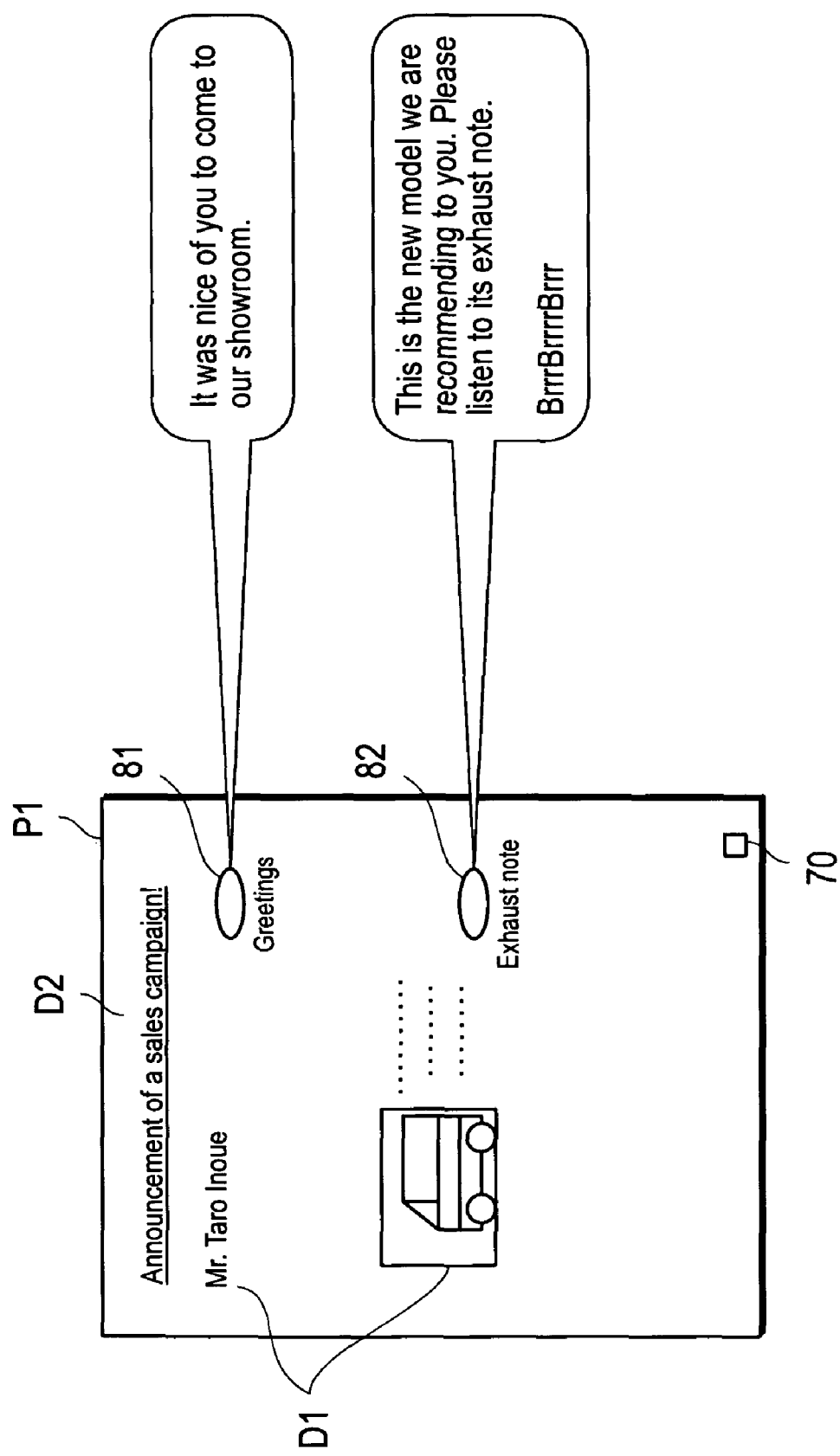
FIG. 9 is an example of sound paper P1 discharged by a post-processing device.
Figure 10:
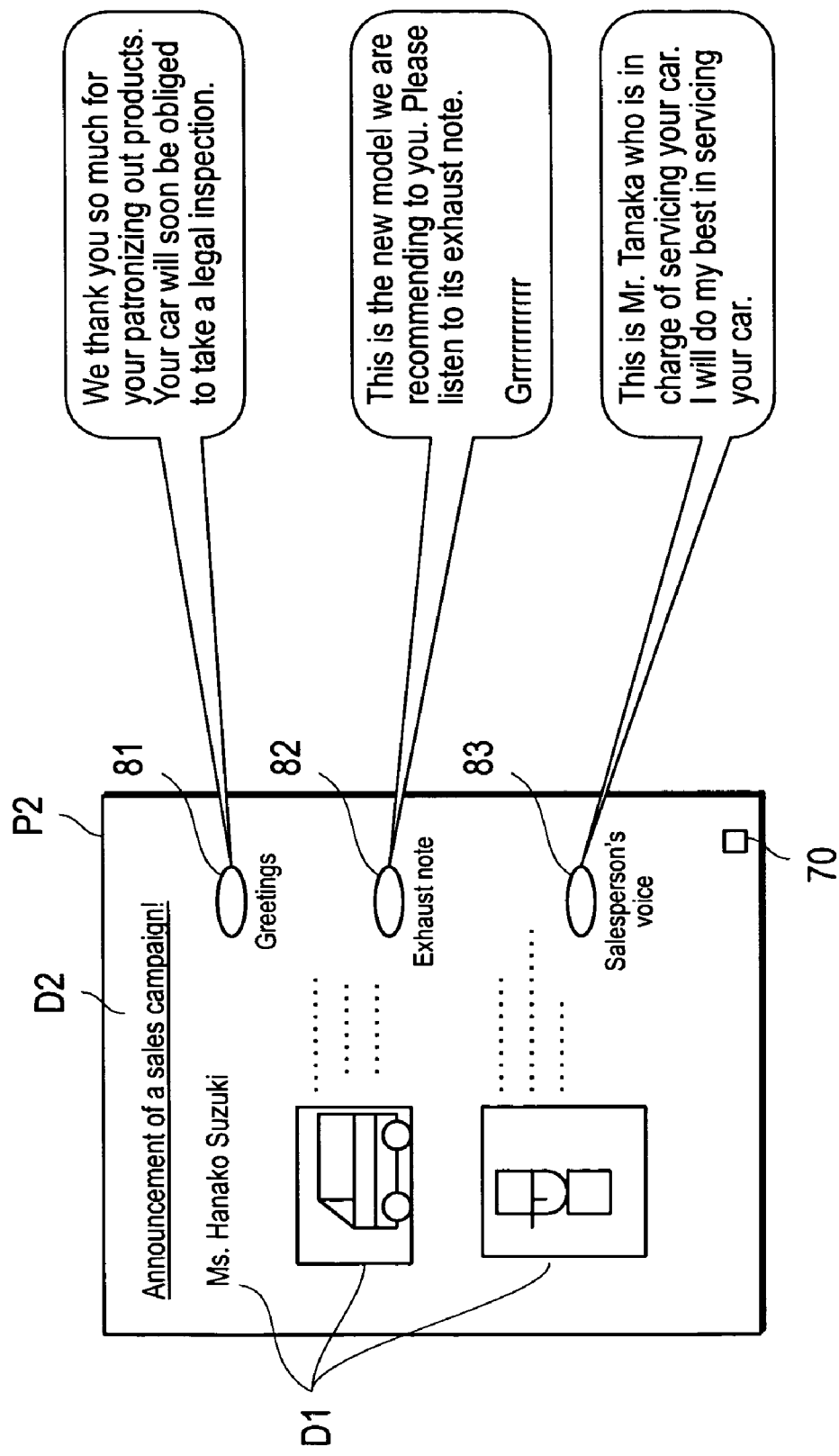
FIG. 10 is an example of sound paper P2 discharged by a post-processing device.

FIG. 9 shows an example of the sound paper P1 discharged from the post-processing device 20 and FIG. 10 shows an example of the sound paper P2 discharged from the post-processing device 20.

The variable data D1 corresponding to an user with a name "Taro Inoue," and the common fixed data D2 applicable to all users, are printed on the sound paper P1 shown in FIG. 9. Mark images 81 and 82 representing sound reproduction buttons, and their accompanying messages are printed on the sound paper P1 respectively. When the user depresses the mark images 81 or 82, an appropriate sound for the user "Taro Inoue" is reproduced as shown in FIG. 9.

The variable data D1 corresponding to an user with a name "Hanako Suzuki," and common fixed data D2 applicable to all users, are printed on the sound paper P2 shown in FIG. 10. Mark images 81, 82, and 83, representing reproduction buttons, and their accompanying messages are printed on the sound paper P2 respectively. When the user depresses the mark images 81, 82, or 83, an appropriate sound for the user "Taro Inoue" will be reproduced as shown in FIG. 10.

As can be seen from the above, it is possible, by using the variable printing, not only to print images which vary with users, but to record sound data corresponding to the printed images.

Therefore, it becomes possible to make a more effective appeal, by means of sound, to each user using the sound paper for the variable printing.

Next, the second embodiment of the invention is described below.

While the sound paper in the first embodiment described above is equipped with the IC tag 70, and the sound data identification information and the sound paper type information are written into the IC tag 70 of the sound paper, the sound paper in the second embodiment is not equipped with an IC tag, and a barcode image obtained through converting the sound data identification information and the sound paper type information is printed on the sound paper instead. Since they are identical with each other except for the above, duplicating explanations are omitted.

Figure 11:
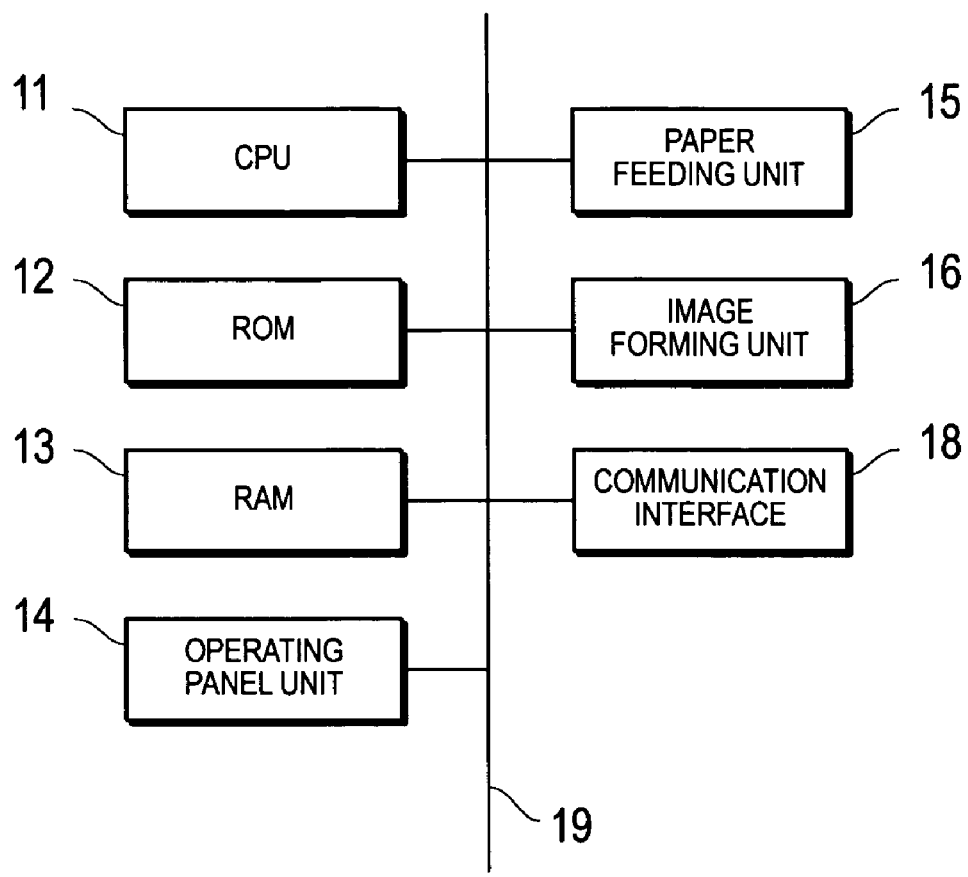
FIG. 11 is a block diagram showing general constitution of a pre-processing device according to the second embodiment.
Figure 12:
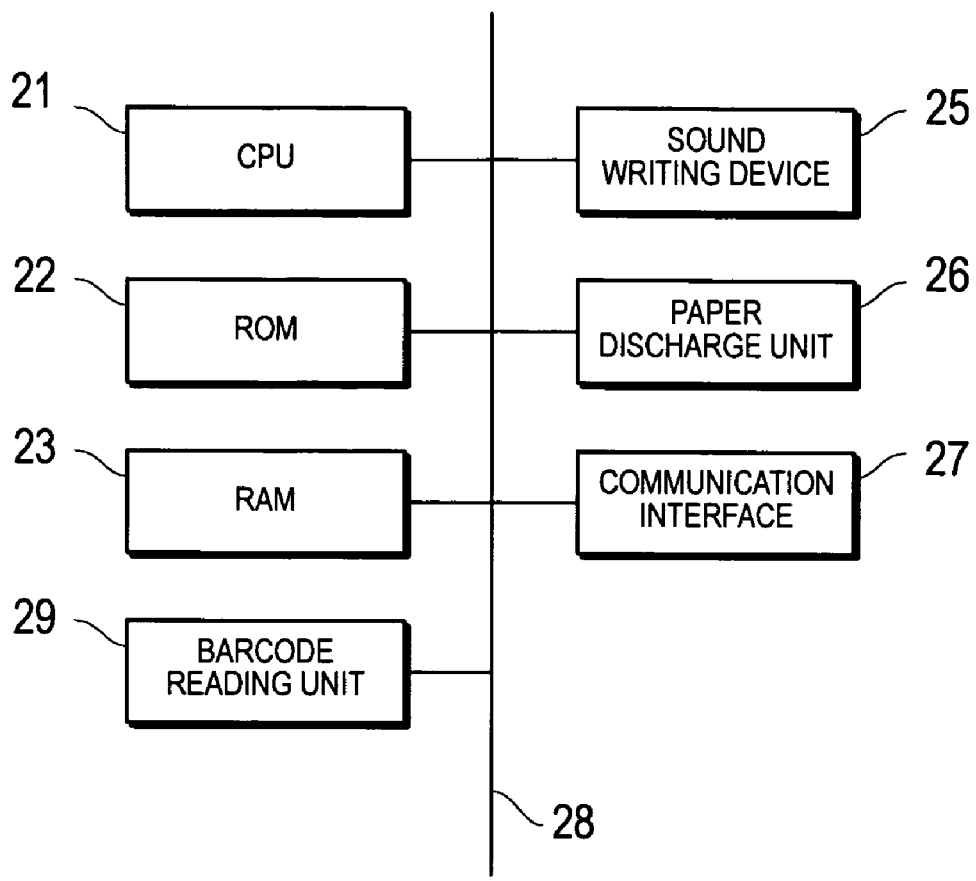
FIG. 12 is a block diagram showing general constitution of a post-processing device according to the second embodiment.

FIG. 11 is a block diagram indicating outline constitution of the pre-processing device 10a of the second embodiment, while FIG. 12 is a block diagram indicating the outline constitution of the post-processing device 20a.

As can be seen from FIG. 11, the pre-processing device 10a does not have an IC tag writer like the IC tag writer 17 of the first embodiment. On the other hand, the ROM 12 stores a barcode-making program for converting the sound data identification information and the sound paper type information into a barcode image. Moreover, although the post-processing device 20a does not have an IC tag reader like the IC tag reader 24 of the first embodiment as shown in FIG. 12, it has a barcode reading unit 29 instead. The barcode reading unit 29 contains an optical sensor for detecting barcode images.

The difference between the image recording process in the pre-processing device 10a and the image recording process of the first embodiment shown in FIG. 6 and FIG. 7 is described as follows.

In particular, although the sound data identification information and the sound paper type information are written into the IC tag 70 of the sound paper in the step S112 of the first embodiment as shown in FIG. 7, this step is omitted in the second embodiment. Instead, the sound data identification information and the sound paper type information are converted into a barcode in the step S109 shown in FIG. 7, and image data of the barcode is combined into one page portion of printing image data. The printing image containing the barcode is printed on the sound paper in the step S110.

Next, the difference between the sound recording process in the post-processing device 20a and the sound recording process of the first embodiment shown in FIG. 8 is described as follows.

Although the electronic data is read from the IC tag 70 provided in the sound paper by the IC tag reader 24 in the first embodiment as shown in the step S202 of FIG. 8, the barcode image on the sound paper is read by means of the barcode reading unit 29 to be converted into the sound data identification information and the sound paper type information in the second embodiment.

Figure 13:
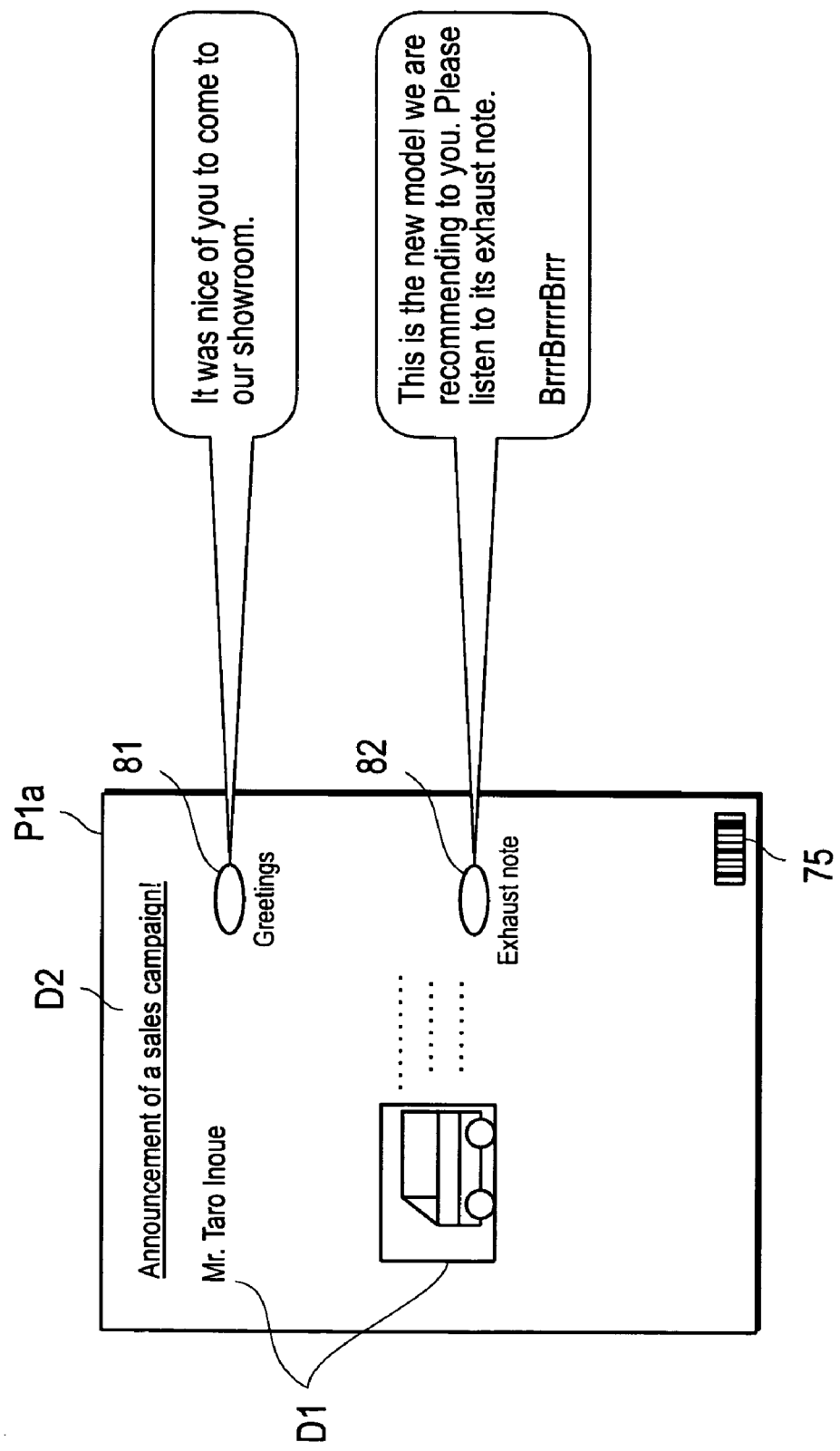
FIG. 13 is an example of sound paper P1*a* discharged by a post-processing device according to the second embodiment.
Figure 14:
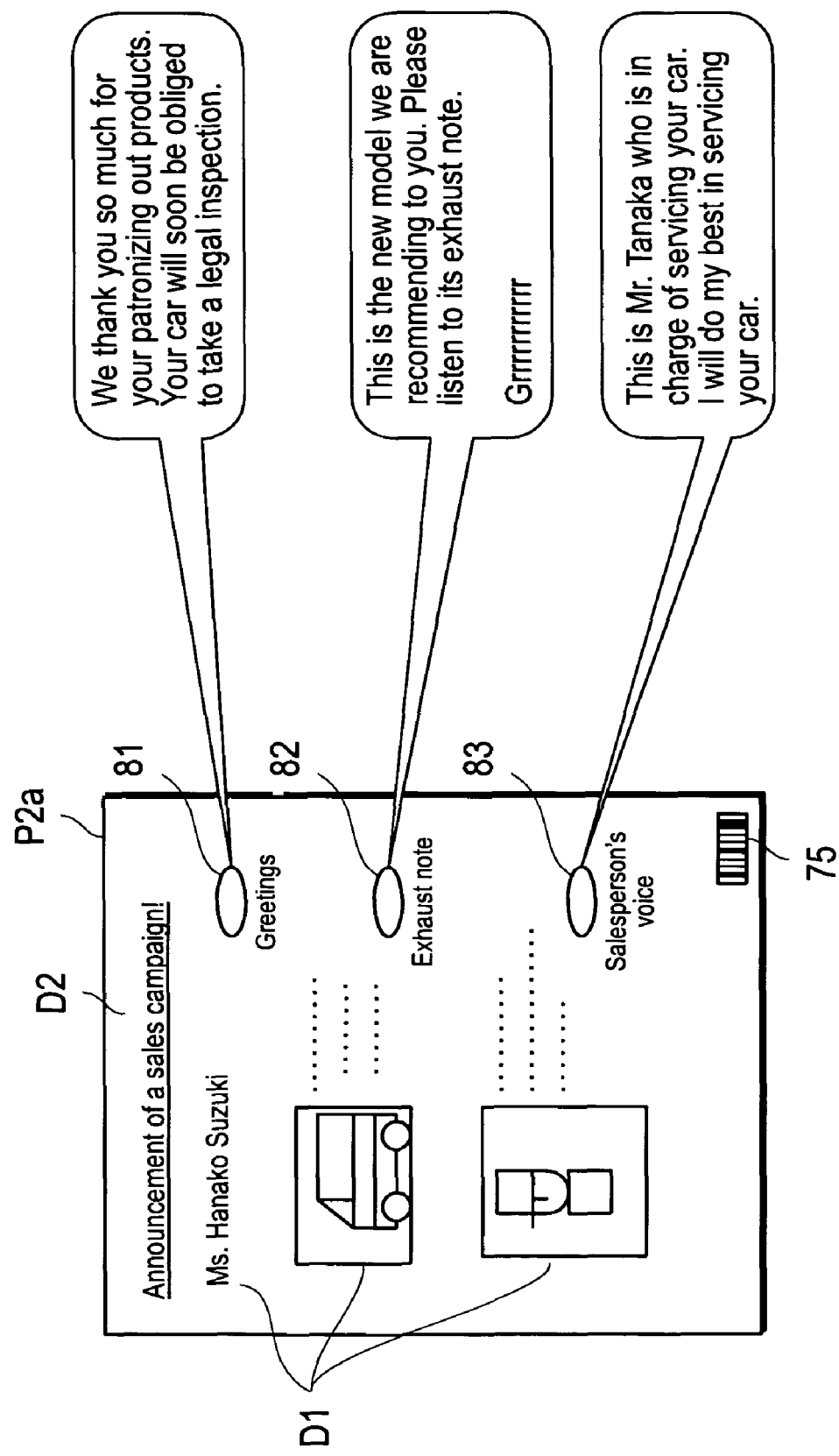
FIG. 14 is an example of sound paper P2*a* discharged by a post-processing device according to the second embodiment.

FIG. 13 shows an example of sound paper P1 a discharged by the post-processing device 20a in the second embodiment, while FIG. 14 shows an example of sound paper P2a discharged by the post-processing device 20a in the second embodiment. It can be seen from these drawings that, while IC tag 70 is provided on the sound paper P1 and P2 used in the first embodiment as shown in FIG. 9 and FIG. 10, no IC tag 70 is provided, but the barcode 75 is provided on the sound paper P1a and P2a used in the second embodiment as shown in FIG. 13 and FIG. 14.

Thus, a similar effect can be achieved in the second embodiment as in the first embodiment.

It is obvious that this invention is not limited to the particular embodiments shown and described above but may be variously changed and modified without departing from the technical concept of this invention.

For example, although the sound paper with the IC tag 70 is described in the first embodiment, and the sound paper equipped with no IC tag in the second embodiment, the invention is not limited to those. Another embodiment of the invention can be constituted in such a way that either sound paper provided with the IC tag 70 or equipped with no IC tag can be used. In such a case, the pre-processing device has both the IC tag writer 17 and the barcode-making program in the ROM 12, and the post-processing device can have both the IC tag reader 24 and the barcode reading unit 29.

In addition, although the pre-processing device functions as an image recording unit for processing image recording and the post-processing device functions as a sound data recording unit for processing sound recording in the abovementioned embodiment, the invention is not limited to it. Another embodiment of the present invention can be constituted in such a way that the pre-processing device functions as a sound data recording unit for processing sound recording, and the post-processing device functions as an image recording unit. In other words, it is possible to replace the order of image recording and sound data recording processes on the sound paper.

Moreover, although the pre-processing device and the post-processing device are provided as independent units, which are connected by a dedicated interface bus, as in the abovementioned embodiments, the present invention is not limited to it. The pre-processing device and the post-processing device can also be contained in a single enclosure as a combined unit in the present invention.

Although the sound data is obtained from the database server 40 on the network 50 in the abovementioned embodiments, the present invention is not limited to it. An embodiment of the present invention can also be constituted so as to have various kinds of sound data stored in the recording system 1 and to obtain desired sound data from the memory unit of the recording system 1.

The means and method of conducting various processes in the recording system according to the present invention can be provided either by means of a dedicated hardware circuit or a programmed computer. Such program can be provided either by a computer readable recording medium such as a flexible disk and a CD-ROM, and can also be supplied on-line via a network such as the Internet. In this case, the program recorded on the computer readable recording medium is normally transferred to and stored in a memory unit such as a hard disk. The program can also be provided as independent application software or built into the software of the image processing device as a part of its function.

What is claimed is:

1. A recording system, comprising:
    an image recording unit for recording an image on sound paper based on image data, wherein the image data includes layout information which indicates a layout of images to be recorded on the sound paper;
    a paper feeding unit for providing a plurality of types of sound paper, each type having a different combination of a sound properties from another type;
    a paper selecting unit for selecting a type of sound paper of the plurality of types of sound paper based on the layout information; and
    a sound data recording unit for recording sound data related to said image data on said sound paper.

2. A recording system as claimed in claim 1, wherein said sound data recording unit records said sound data on the sound paper on which said image has been recorded by said image recording unit.

3. A recording system as claimed in claim 2, wherein said image recorded on said sound paper by said image recording unit contains an identification image that relates said image data to said sound data.

4. A recording system as claimed in claim 3, wherein said identification image includes a barcode image.

5. A recording system as claimed in claim 1, wherein said sound paper has a storage unit that is capable of storing information provided by wireless communication from outside; either one of said image recording unit and said sound data recording unit is equipped with an information recording unit for recording identification information that relates said image data and said sound data, on said storage unit; and the other one of said image recording unit and said sound data recording unit is equipped with an information reading unit for reading said identification information from said storage unit.

6. A recording system as claimed in claim 1, wherein said image recording unit comprises:
    a receiving unit for receiving a printing instruction from outside; and
    an image forming unit for forming an image based on image data generated according to said printing instruction, on said sound paper selected by said paper selecting unit.

7. A pre-processing device, which is applied to a recording system containing an image recording device for recording an image on sound paper based on image data, wherein the image data includes layout information which indicates a layout of images to be recorded on the sound paper, a paper selecting unit for selecting a type of sound paper from a plurality of types of sound paper, each type having a different combination of a sound properties from another type, based on the layout information, and a sound data recording device for recording sound data related to said image data on said sound paper, wherein either one of said image recording device and said sound data recording device is used as a pre-processing device and the other is used as a post-processing device, said pre-processing device comprising a recording unit for recording identification information that relates said image data and said sound data on said sound paper.

8. A pre-processing device as claimed in claim 7, wherein said identification information includes an identification image, and said recording unit includes an image forming unit for forming said identification image on said sound paper.

9. A pre-processing device as claimed in claim 8, wherein said identification image includes a barcode image.

10. A pre-processing device as claimed in claim 7, wherein said sound paper has a storage unit that is capable of storing information provided by wireless communication from outside, and said recording unit has an information recording unit for recording identification information that relates said image data and said sound data, on said storage unit.

11. A post-processing device, which is applied to a recording system containing an image recording device for recording an image on sound paper based on image data, wherein the image data includes layout information which indicates a layout of images to be recorded on the sound paper, a paper selecting unit for selecting a type of sound paper from a plurality of types of sound paper, each type having a different combination of a sound properties from another type, based on the layout information; and a sound data recording device for recording sound data related to said image data on said sound paper, wherein either one of said image recording device and said sound data recording device is used as a pre-processing device and the other is used as a post-processing device, said post-processing device comprising a reading unit for reading identification information recorded on said sound paper to relate said image data and said sound data.

12. A post-processing device as claimed in claim 11, wherein said identification information includes an identification image, and said reading unit includes an optical sensor for reading said identification image.

13. A post-processing device as claimed in claim 12, wherein said identification image includes a barcode image.

14. A post-processing device as claimed in claim 11, wherein said sound paper has a storage unit that is capable of storing information provided by wireless communication from outside, said reading unit includes an information reading unit for reading identification information that relates said image data and said sound data, from said storage unit.

15. A recording method of recording image and sound data on sound paper, wherein the image data includes layout information which indicates a layout of images to be recorded on the sound paper, the method comprising the steps of:
1) selecting a type of sound paper from a plurality of types of sound paper, each type having a different combination of a sound properties from another type, based on the layout information;
2) recording an image on the sound paper based on the image data; and
3) recording the sound data related to said image data on said sound paper.

16. A recording method as claimed in claim 15, wherein said step 3) is executed after said step 2).

17. A recording method as claimed in claim 16, wherein said image recorded on said sound paper in said step 2) includes an identification image that relates said image data to said sound data.

18. A recording method as claimed in claim 17, wherein said identification image includes a barcode image.

19. A recording method as claimed in claim 15, wherein said sound paper has a storage unit that is capable of storing information provided by wireless communication from outside, identification information that relates said image data and said sound data is recorded on said storage unit in either one of said step 2) and said step 3), and said identification information is read from said storage unit in the other one of said step 2) and said step 3).

20. A recording method as claimed in claim 15, wherein said step 2) comprises the steps of: 4) receiving a printing instruction from outside; and 5) forming an image based on image data generated according to said printing instruction on said sound paper selected in said step 1).

* * * * *